United States Patent [19]
Eady

[11] Patent Number: 6,080,685
[45] Date of Patent: Jun. 27, 2000

[54] ABRASION RESISTANT PLASTIC BONDED TO A DIAPHRAGM

[75] Inventor: Eldon S. Eady, Greensburg, Pa.

[73] Assignee: Westinghouse Air Brake Company, Wilmerding, Pa.

[21] Appl. No.: 08/951,682

[22] Filed: Oct. 16, 1997

Related U.S. Application Data

[63] Continuation of application No. 08/643,604, May 6, 1996, abandoned.

[51] Int. Cl.[7] .................................................... F01B 19/00
[52] U.S. Cl. ............................. 442/66; 92/96; 92/103 SD; 92/103 F; 92/103 R
[58] Field of Search ........................... 442/66, 278; 92/96, 92/103 R, 103 SD, 103 F

[56] References Cited

U.S. PATENT DOCUMENTS 5,009,778  4/1991  Nickerson et al. .................. 210/198.2
5,349,896  9/1994  Delaney, III et al. .................. 92/98 R

*Primary Examiner*—Elizabeth M. Cole
*Attorney, Agent, or Firm*—James Ray & Associates

[57] ABSTRACT

An improved diaphragm substantially resistant to abrasive wear for use in certain applications in which at least a portion of such diaphragm is in contact with another surface which would tend to abrade such diaphragm, such diaphragm comprising at least one layer of a flexible material selected from a group including natural rubber, synthetic rubber, fabric reinforced rubber, plastic and mixtures thereof and an abrasion resistant polymeric material having a predetermined thickness. This abrasion resistant polymeric material is adhered to such diaphragm at least in the portion that such diaphragm is in contact with another surface and is subject to abrasion. This type of abrasion generally occurs in the flange area of the diaphragm.

8 Claims, 1 Drawing Sheet

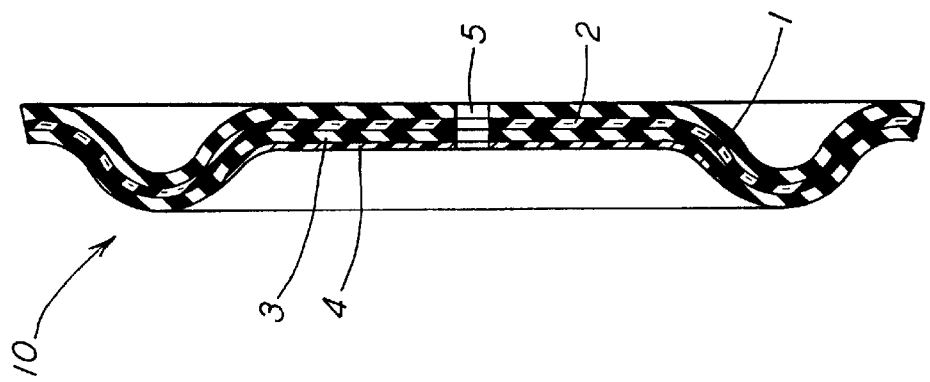
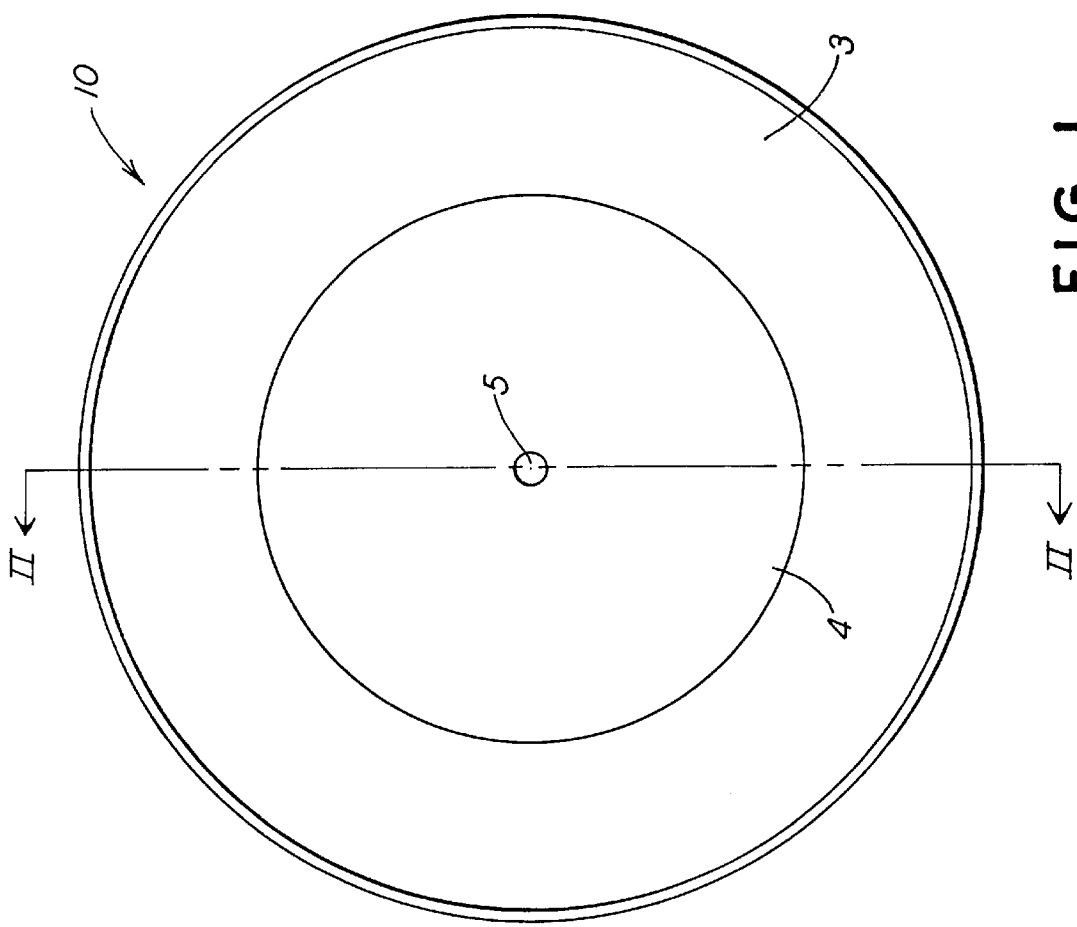

6,080,685

ABRASION RESISTANT PLASTIC BONDED TO A DIAPHRAGM

CROSS-REFERENCE TO RELATED APPLICATIONS

This application is a continuation of patent application Ser. No. 08/643,604, filed May 6, 1996, now abandoned.

FIELD OF INVENTION

The present invention relates, in general, to pumps and pumping systems and, more particularly, this invention relates to diaphragms used in such pumps which have a substantially abrasion resistant plastic material bonded to the flange area of the diaphragm where wear is most likely to occur.

BACKGROUND

As is generally well known in the prior art, diaphragms are an integral part of pumps. It is necessary in these applications for the diaphragms to be flexible in order for them to perform their function. However, the constant flexing of the diaphragm when the pump is in use creates stresses on the parts of the diaphragm that are attached to the non flexing portions (i.e. flange) of the pump.

The flange holds the diaphragm and secures it in place in the pump. This area of the diaphragm normally exhibits rather severe wear and after extended use will eventually crack and/or have holes wear through the diaphragm. When this occurs the pump is out of commission until a new diaphragm can be installed to replace the worn out diaphragm.

In most cases the rest of the diaphragm is still in relatively good shape. Only at these wear points, under normal circumstances, does the diaphragm reveal a problem. The replacement of the diaphragm is only one of the problems that maintenance personnel encounter. The location of many pumps are such that they may be very difficult to get to and even after reaching the pump performing the work of replacing a diaphragm presents a challenge.

Thus, the longer a pump can be kept in operation without the need for servicing represents a considerable savings in not only the maintenance personnel's time but in the "up" time for whatever operation the pump is being used. Any improvement in the formulation of the diaphragm that can increase its usable life expectancy is a welcome improvement.

The present invention is specifically related to improving the wear characteristics of a diaphragm at these aforementioned stress points.

SUMMARY OF THE INVENTION

The present invention, in a first aspect thereof, provides an improved diaphragm substantially resistant to abrasive wear for use in certain applications in which at least a portion of such diaphragm is in contact with another surface which would tend to abrade such diaphragm. Such diaphragm comprises at least one layer of a flexible material selected from a group comprising natural rubber, synthetic rubber, fabric reinforced rubber, plastic and mixtures thereof; and an abrasion resistant polymeric material. Such polymeric material, selected from a group consisting of PEEK, Teflon, Viton and various other ketone based resins, has a predetermined thickness, and is adhered to such flexible material at least in a portion of such diaphragm that is in contact with another surface.

According to a second aspect, the present invention provides a method of manufacturing an improved diaphragm that is substantially resistant to abrasive wear for use in certain applications in which at least a portion of such diaphragm is in contact with another surface which would tend to abrade it. Such method comprises the steps of first cutting a flexible material, which consists of at least one layer of material selected from a group consisting of natural rubber, synthetic rubber, fabric reinforced rubber, plastic and mixtures thereof, to a predetermined size and a predetermined shape. According to the invention, a predetermined surface of an abrasion resistant plastic material is abraded. Such abrasion resistant plastic material is selected from a group consisting essentially of PEEK, Teflon, Viton, and various other ketone based resins. Such abrasion resistant plastic material is cut to a predetermined size which is at least sufficient to cover an area of such flexible material which forms such portion of such diaphragm in contact with another surface which would tend to abrade such diaphragm. An adhesive is applied to such abraded surface. Such abrasion resistant plastic material is placed to cover at least a portion of such flexible material which forms such portion of such diaphragm in contact with another surface which would tend to abrade such diaphragm, with contact being made with such abraded surface covered with adhesive thereby forming a composite. Such composite is then molded with high pressure and elevated temperature. Such composite is cured for a predetermined time. Finally any excess on such composite is trimmed, a center hole is punched and such diaphragm is ready for shipping.

OBJECTS OF THE INVENTION

It is, therefore, one of the primary objects of the present invention to provide an improved diaphragm that will resist wear at least in the flange area where such diaphragm is secured to the pump and is most susceptible to wear.

Another object of the present invention is to provide an improved diaphragm by bonding an abrasion resistant plastic material that will resist abrasion to such diaphragm at least in such flange area.

Still another object of the present invention is to provide an improved diaphragm by bonding an abrasion resistant plastic material to such diaphragm without substantially affecting such diaphragm's flexibility.

Additionally, it is an object of the present invention to provide a manufacturing process in which a diaphragm with an abrasion resistant material bonded to such diaphragm would be ready for use after molding without any additional processing.

In addition to the objects and advantages of the present invention which has been described in detail above, various other objects and advantages will become readily apparent to those persons skilled in pumping systems and more particularly diaphragms from the following more detailed description of such invention particularly when such description is taken in conjunction with the attached drawing Figures and with the appended claims.

BRIEF DESCRIPTION OF THE DRAWINGS

FIG. 1 is a plan view of a typical circular diaphragm incorporating a presently preferred embodiment of the invention; and FIG. 2 is a cross-sectional view taken along the lines A—A of FIG. 1.

BRIEF DESCRIPTION OF THE PRESENTLY PREFERRED EMBODIMENT OF THE INVENTION

Prior to proceeding to the more detailed description of the present invention, it should be noted that for the sake of clarity in understanding the invention, identical components with identical functions have been designated with identical reference numerals throughout the drawing Figures.

Reference is now made, more particularly, to FIGS. 1 and 2. Illustrated therein is a presently preferred embodiment of the diaphragm, which has been generally designated 10. As noted, FIG. 1 is a top view of such diaphragm 10 showing the basic shape of one such diaphragm and FIG. 2 is a cross-sectional view of such circular diaphragm 10 across a diameter.

This view shows the multilayered composite diaphragm 10 with such abrasion resistant plastic material 4 bonded to the area which will receive the flange. The flange, not shown, is bolted to the diaphragm through aperture 5. In this example such composite diaphragm 10 is formed with a base rubber 1, an inner layer of fabric reinforced rubber 2, a layer of neoprene 3, and an abrasion resistant plastic material 4 bonded to such layer of neoprene 3 at the flange area of such diaphragm 10.

The presently preferred embodiment for manufacturing such improved diaphragm 10 involves the following steps in the process. The first step involves a selection of which flexible material or materials is to be used to form such diaphragm 10. The end use will generally determine whether a single layer of rubber or a composite of two or more layers is desirable and also which type of rubber is preferred. After such material and/or materials are selected they are cut to a predetermined size and a predetermined shape to manufacture such diaphragm 10.

The diaphragm 10 could be a three piece "oreo" with a rubber layer, a fabric reinforced rubber inner layer, and another rubber layer; or a four piece layup with four layers of rubber; or any of the various formulations used for diaphragms. In a preferred embodiment of the invention, neoprene 3 is used as a layer to which an abrasion resistant plastic material 4 is bonded. Neoprene 3 is a preferred material as a bonding layer for such abrasion resistant plastic material 4 because it was found that although good adhesion is obtained with most of such rubber formulations the best adhesion is with neoprene. It has been determined that the best results are obtained when such abrasion resistant plastic material 4 is bonded to such diaphragm 10 with an adhesive force of substantially between about 30 to about 300 pounds per linear inch.

Reference is again made to FIG. 2 in which diaphragm 10 is an example of a three layered diaphragm with neoprene 3 as the bonding surface for such abrasion resistant plastic material 4.

Once the selection of such diaphragm is determined then a selection is made as to which abrasion resistant plastic material 4 will be used. Again the specific application will be of prime importance in determining which plastic will be used. The specific application will generally determine whether PEEK, Teflon, polytetrafluoroethylene, trademark of E.I DuPont Viton, fluoroelastomer, trademark of E.I.DuPont or another of the various ketone based plastic materials is to be used as such abrasion resistant plastic material 4.

In a preferred embodiment of the present invention, PEEK is used as such abrasion resistant plastic material 4. PEEK exhibits many properties which are ideal for this application. One such advantage is that it can be milled into a thin sheet which permits the use of a thinner plastic layer for abrasion resistance. Thinner plastic sheets are highly desirable since they are not only easier to work with but also do not substantially reduce the flexibility of a diaphragm. The abrasion resistant plastic layer covers the area on the concave side of the diaphragm in contact with the flange and extends only on a relatively small portion of the flexing portion of the diaphragm. Even though thin sheets are preferred they must still provide adequate abrasion resistance which is their primary function. PEEK, even in relatively thin sheets, provides excellent abrasion resistance. In an embodiment of the present invention such thickness of such abrasion resistant plastic material 4 is substantially between about 10 mils and about 50 mils thick. In a presently preferred embodiment of the invention such thickness of such abrasion resistant plastic material 4 is substantially between about 15 mils and about 30 mils thick.

The surface of such abrasion resistant plastic material 4 that is to be bonded to such diaphragm 10 is abraded prior to bonding. Abrasion of the surface is an important step in the process because it enhances adhesion. In a preferred embodiment of the invention sandblasting is used to abrade the surface of such abrasion resistant plastic material 4. Another method of abrasion is chemical etching which may be used alone or in addition to sandblasting.

In a preferred embodiment of the invention, Chemlok 205 primer is used to chemically etch the abraded surface of such abrasion resistant plastic material 4. This is a low viscosity primer which penetrates the surface. After the surface has been properly abraded, such abrasion resistant plastic material 4 is then cut to a predetermined size.

When the surface of such abrasion resistant plastic material 4 is properly prepared it is then coated with a preselected adhesive. In a preferred embodiment of the present invention, Thixon 2000 is used as an adhesive. The diaphragm 10 with such abrasion resistant plastic material 4 in place is laid up as a composite and is prepressed in a range of generally between about 25 and about 125 pounds to hold such abrasion resistant plastic material 4 in place before it is put in a mold. In a preferred embodiment of the invention such prepressing is in the range of between about 70 and about 90 pounds.

The diaphragm composite with such abrasion resistant plastic material 4 in place is then placed in a mold. In a preferred embodiment of the invention such composite is pressed with substantially between about 200 tons and about 450 tons of pressure and is molded substantially between about 320° and about 380° Fahrenheit. Under these conditions, curing time is between about 4 minutes and about 10 minutes. Molding can take place at temperatures as low as 300° Fahrenheit; however, at this temperature curing times then can exceed 30 minutes. It should be noted that exceeding 380° Fahrenheit can create problems in the final product. At temperatures greater than 380° volatiles are evolved. The loss of these volatiles both inhibits adhesion and prevents true vulcanization from taking place.

The diaphragm comes out of the mold totally cured. It is a two, three, four or five piece layup bonded together chemically. It should be emphasized that although the drawing FIG. 2 shows the individual layers as distinct layers the diaphragm is chemically bonded after it is molded and cured. Such product is complete. All that is required is some trimming of any outer excess and punching a center hole and there is a product ready for shipping.

While a presently preferred embodiment of the present invention has been described in detail above, it should be understood that various other adaptations and/or modifications of the invention can be made by those persons who are particularly skilled in the art related to pumping systems and more particularly diaphragms without departing from either the spirit of the invention or the scope of the amended claims.

I claim:

1. An improved fluid pump diaphragm substantially resistant to abrasive wear for use in certain applications in which at least a portion of said diaphragm is in contact with a flange of such fluid pump which would tend to abrade said diaphragm, said diaphragm comprising:

(a) a generally flat center portion, (b) a generally arcuately shaped flexure annular portion connected at an inner periphery thereof to an outer periphery of said generally flat portion, said generally arcuate shaped flexure annular portion having a convex surface and a concave surface, (c) an outer edge portion connected at an inner periphery thereof to an outer periphery of said generally arcuately shaped flexure annular portion of said diaphragm for securing said diaphragm to a pump housing, wherein said generally flat center portion, said generally arcuately shaped flexure annular portion and said outer edge portion include at least one layer of a flexible material selected from a group including natural rubber, synthetic rubber, fabric reinforced rubber, plastic and mixtures thereof, (d) an abrasion resistant polymeric material, having a predetermined thickness and a predetermined size, adhered to said generally flat center portion and to a predetermined portion of said convex surface of said generally arcuately shaped flexure annular portion of said at least one layer of said flexible material of said diaphragm, said predetermined size being sufficient to cover that portion of said generally flat center portion and at least said predetermined portion of said convex surface of said generally arcuately shaped flexure portion of said diaphragm that is in contact with such flange of such fluid pump which would tend to abrade said diaphragm, and (e) a central aperture formed in and through said generally flat portion of said diaphragm and said abrasion resistant polymeric material, said central aperture having a predetermined diameter for attaching said diaphragm to a piston rod of such pump.

2. An improved diaphragm substantially resistant to abrasive wear, according to claim 1, wherein said abrasion resistant polymeric material is bonded to said diaphragm by an adhesive.

3. An improved diaphragm substantially resistant to abrasive wear, according to claim 1, wherein said abrasion resistant polymeric material is a plastic selected from a group consisting essentially of PEEK, polytetrafluoroethylene, fluoroelastomer and various other ketone based resins.

4. An improved diaphragm substantially resistant to abrasive wear, according to claim 3, wherein said plastic is PEEK.

5. An improved diaphragm substantially resistant to abrasive wear, according to claim 2, wherein a predetermined surface of said abrasion resistant plastic which is to be bonded to said diaphragm is abraded before said adhesive is applied.

6. An improved diaphragm substantially resistant to abrasive wear, according to claim 2, wherein said abrasion resistant plastic is bonded to said diaphragm with an adhesive force of substantially between about 30 to about 300 pounds per linear inch.

7. An improved diaphragm substantially resistant to abrasive wear, according to claim 1, wherein said predetermined thickness of said abrasion resistant plastic is substantially between about 10 mils and about 50 mils thick.

8. An improved diaphragm substantially resistant to abrasive wear, according to claim 7, wherein said predetermined thickness of said abrasion resistant plastic is substantially between about 15 mils and about 30 mils thick.

\* \* \* \* \*